(No Model.)
O. ZWIETUSCH.
PROCESS OF FINISHING BEER.
No. 447,484. Patented Mar. 3, 1891.
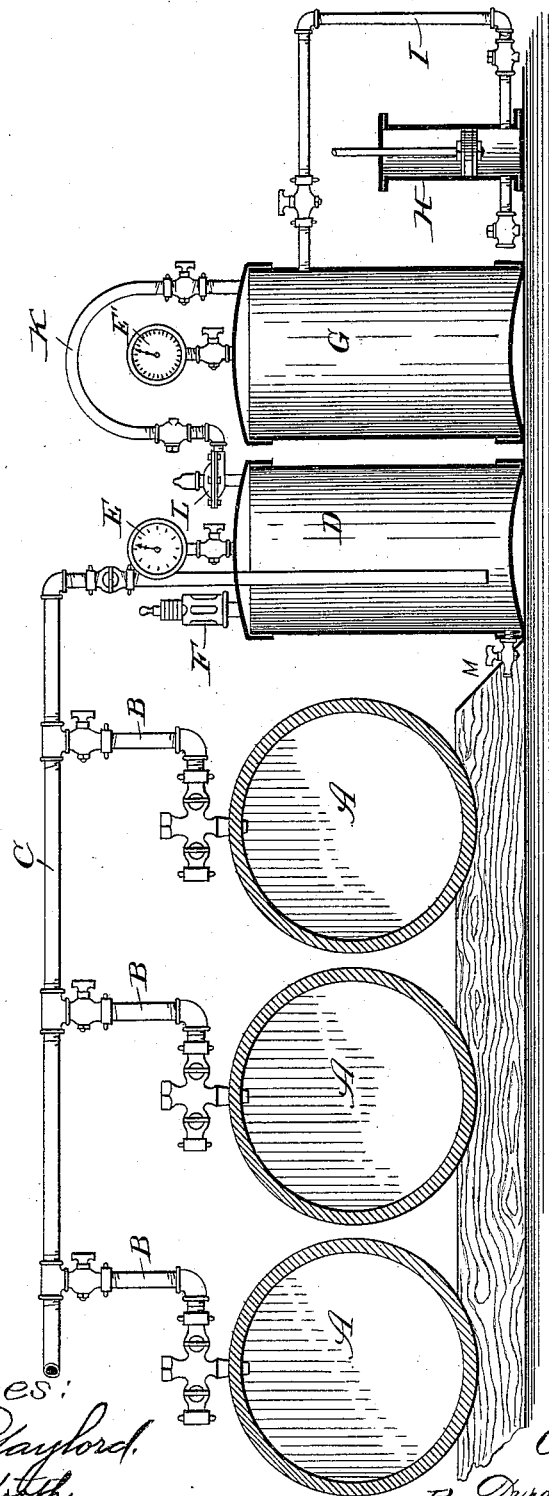
Witnesses:
Chas. E. Gaylord.
J. W. Dyrenforth.
Inventor:
Otto Zwietusch,
By Dyrenforth & Dyrenforth
Atty's

UNITED STATES PATENT OFFICE.

OTTO ZWIETUSCH, OF MILWAUKEE, WISCONSIN.

PROCESS OF FINISHING BEER.

SPECIFICATION forming part of Letters Patent No. 447,484, dated March 3, 1891.

Application filed September 26, 1888. Serial No. 286,415. (No specimens.)

*To all whom it may concern:*

Be it known that I, OTTO ZWIETUSCH, a citizen of the United States, residing at Milwaukee, in the county of Milwaukee and State of Wisconsin, have invented a new and useful Improvement in the Process of Finishing Beer, of which the following is a specification.

My invention relates to an improvement in the process of finishing beer by means of a so-called "bunging apparatus." As is well known to every one familiar with the art of brewing, the bunging apparatus comprises a pressure-relief valve at the terminus of a discharge-conduit leading from the gas-space of the cask or from the gas-spaces of a series of connected casks. The beer is transferred to the finishing-casks from the storage-casks, and a new and active fermentation is excited in them by the introduction of fresh wort, called "kraeusen," from the main fermenting-vats; and either immediately upon the introduction of the kraeusen or subsequently, according to the preference of the brewer, gelatinous matter called "finings," is usually introduced into the casks, the tendency of which is to promote the settling of impurities to the bottom. This period of finishing beer for the market by an induced secondary fermentation is commonly called the "after fermentation," but has sometimes been referred to, owing to the introduction of kraeusen, as the "kraeusen stage in the shavings-casks," and the function of a bunging apparatus is to hold the beer during the whole or a portion of this stage of the manufacture under automatically-controlled pressure of the self-generated carbonic-acid gas, the advantages of which mode of treatment have become too well known in the art to require recital here. With the most approved bunging apparatuses, however, as heretofore constructed and applied, the results are not uniformly satisfactory. Thus it is usual to set the pressure-relief valve to discharge at a pressure of not less than six pounds, and the self-generated carbonic-acid gas must exceed this pressure in the cask, or, if several casks are connected, throughout the whole series, before the bunging apparatus can perform its principal function, and this pressure is not attained until after the lapse, ordinarily, of several days, even under the most favorable conditions; but it frequently happens that a cask is not air-tight or that the bungs or fittings pertaining to the bunging apparatus are more or less porous, and in this event many days may and frequently do elapse before the required pressure can be obtained, while in some cases the leakage is so great that the pressure will never rise above three or four pounds. Where several casks are connected, a defect of the above nature in one cask must obviously affect the whole series, thus multiplying the injurious effects. This constitutes one of the principal defects of the connected system, and the annoying delays and losses encountered in consequence are so frequent, and at times so serious, that many brewers have been led to prefer the "single-bung system" so called, which, while far less desirable than the connected system in most respects, has at least the one advantage of preventing the defects of one cask from affecting others. Moreover, in practicing the connected system of bunging it is customary to annex from time to time additional casks, wherein the induced secondary or after fermentation is incipient; and since the connection of the gas-spaces permits an intertransfusion of gas throughout the whole series of casks, and since the flow will instantly occur from the point of greater to the point of lower pressure and will continue until equilibrium is established, it is obvious that the annexation of fresh casks must serve to diminish the pressure in those wherein the fermentation is more advanced. For this reason, as the method of connected bunging has heretofore been practiced, it has been necessary to use much discretion in the annexation of fresh casks containing beer in an incipient stage of after fermentation, since if too low a pressure existed in the previously-connected casks the finishing process might be materially retarded by such annexation, and under these circumstances if it were at all possible to add fresh casks to the series they could only be added one or two at a time without causing too great a reduction of the pressure.

By my improved process the foregoing difficulties are overcome, and in addition to this the clarification of the beer is materially accelerated, for reasons which will be hereinafter explained.

My process consists, generally, in opposing the flow of carbonic-acid gas from the beer through the discharge-conduit to the pressure-relief valve (whether in the form of a spring or gravity safety-valve or a water column) by means of a counter-pressure automatically maintained at a predetermined degree corresponding approximately with the desired ultimate pressure in the beer, and more particularly in causing an accumulation of the self-generated carbonic-acid gas to take place while on its way from the beer through the discharge-conduit to the pressure-relief valve, and directing upon the accumulated gas a counter-pressure of the degree above defined, whereby any ordinary deficiency of pressure occurring in any cask or series of casks will be supplied by a retrogression of the gas.

My process is capable of being carried into effect by various mechanical agencies, but a form of apparatus which is adapted to fulfill all requirements is represented in vertical section in the drawings. A description is as follows:

A A are the finishing-casks, connected, as usual, by valved flexible pipes B to the common conduit C. Instead of leading directly to a pressure-relief valve, in the usual manner, the pipe C dips down into a reservoir D, extending nearly to the bottom thereof, and this reservoir, which thus forms what may be regarded as an expanded section of the common conduit, is in turn surmounted by the usual pressure-gage E and pressure-relief valve F. The latter may be of any one of the approved forms common in the art, and it should be set to discharge at about six pounds pressure.

G represents a reservoir for compressed air, surmounted by a pressure-gage E', and H is an air-pump for supplying the reservoir through the pipe I.

K is a pipe connecting the reservoir G with the upper part of the reservoir D, through a pressure-reducing valve L, which should be set to about the same pressure as the pressure-relief valve F; in other words, approximately to the desired ultimate pressure in the beer.

The various pipes should be provided with valves, substantially as indicated, and the reservoir D should be provided with a faucet M toward its lower end for drainage purposes. The reservoir G would ordinarily be the compressed-air reservoir employed in breweries for racking off the beer.

The operation is as follows: When the kraeusen is added to the beer in the finishing-casks, it is allowed to generate gas and subsequently work out through open bung-holes for several days before applying the bunging apparatus. Much better results will be obtained by following this course than by applying the bunging apparatus immediately after adding the kraeusen, and thus holding the beer under automatically-controlled pressure of carbonic-acid gas from the beginning of this so-called "kraeusen stage" onward. After the induced secondary fermentation has proceeded for a few days the casks should be bunged (the finings, if employed at all, being added immediately before the bunging) and the connections of the bunging apparatus opened to cause the air from the reservoir G to exert the required pressure upon the beer in the casks at once through the medium of the pressure-reducing valve L. In this way much time will be saved as well as finings. The finings and impurities will be found to settle down much more rapidly under this fixed uniform pressure than when the pressure is only acquired gradually by the accumulation of carbonic-acid gas generated by the fermentation, because in the latter case the rising gas impedes the settling of the finings, and with them the impurities. Moreover, a steady, constant, and uniform pressure of carbonic-acid gas hastens the process of clarification. If the pressure of carbonic-acid gas is materially increased at any time during the clarifying process, an additional precipitation is created, causing a new or increased condition of turbidity. A relaxation of pressure produces a like increase of turbidity, due, however, to disturbance from below. Thus variation of pressure in either direction causes a like retardation of the clarifying process, and the advantages of uniformity in the pressure will hence be readily apparent. The objects to be attained in the after fermentation are, first, a proper ripening and enlivening of the beer in the casks, and, secondly, such a precipitation and settling of the main elements of turbidity as will secure to the beer the required degree of brilliancy. By my process these results may be obtained with a material saving in point of time, not only without the use of finings, but also in a sufficient degree, even without the use of shavings, especially where, in addition, a process of filtration is employed. When the carbonic-acid gas has been generated in the fermenting-casks to the predetermined pressure, (six pounds, for example,) the excess of carbonic-acid gas over this pressure will enter the reservoir D and force the air in advance of it out through the pressure-relief valve F, the air, as long as any remains in the reservoir D, always occupying the higher position, by reason of the relative weights of the two fluids. If any leak occurs in a cask or its connections, causing a diminution of the pressure of carbonic-acid gas below the established degree, the pressure-reducing valve L will automatically admit air from the reservoir G, at the predetermined pressure, upon the surface of the carbonic-acid gas in the reservoir D, forcing backward into the system the quantity of that gas necessary to supply the deficiency, and an entirely analogous effect takes place when in the connected system newly-bunged casks are annexed to a discharge-conduit which is serving for casks containing beer in a more advanced stage or after fermentation. In this case, instead of reducing the more advanced casks below the established pressure, the beer in the fresh casks is immediately brought under that pressure by a retrogression of gas from the reservoir D. Thus with my process no difficulty is encountered in annexing additional casks to the series; but they may be annexed in any required number and all at once without affecting the more advanced casks. When the pressure of generated gas again exceeds the established pressure, the surplus will force the air out through the pressure-relief valve F, and eventually, when the reservoir D becomes exhausted of air, will itself pass off in the same manner.

What I claim as new, and desire to secure by Letters Patent, is—

1. In bunging beer, the method of maintaining the beer under a predetermined pressure after sufficient carbonic-acid gas has been generated by the beer to give that pressure, which consists in collecting a supply of carbonic-acid gas as it is generated by the beer, forcing the collected carbonic-acid gas back in a retrograde movement toward the beer whenever the pressure upon the beer shall fall below the predetermined pressure, and throughout the operation relieving the beer from any pressure in excess of the predetermined pressure, substantially as described.

2. In bunging beer, the method of maintaining the beer under a predetermined pressure after sufficient carbonic-acid gas shall have been generated by the beer to give that pressure, which consists in collecting a supply of carbonic-acid gas as it is generated by the beer, forcing the collected carbonic-acid gas back in a retrograde movement toward the beer by the pressure of an extraneous aeriform fluid whenever the pressure upon the beer shall fall below the predetermined pressure, and throughout the operation relieving the beer from any pressure in excess of the predetermined pressure, substantially as described.

3. In bunging beer, the method of placing the beer at will and maintaining it under a predetermined pressure, which consists in supplying to the beer an extraneous aeriform fluid at substantially the predetermined pressure until the pressure of carbonic-acid gas generated in the beer shall cause a retrogression of the extraneous aeriform fluid, collecting a supply of the advancing carbonic-acid gas, forcing the collected carbonic-acid gas back toward the beer in a retrograde movement by a pressure of the extraneous aeriform fluid whenever the pressure upon the beer shall fall below the predetermined pressure, and throughout the operation relieving the beer from any pressure in excess of the predetermined pressure, substantially as described.

4. In bunging beer in connected casks, the method of establishing in the casks a predetermined pressure of carbonic-acid gas generated by the beer and maintaining that pressure notwithstanding leakage, and, without detracting from the pressure in those casks previously in the series, imparting it to any casks of freshly-bunged beer which may be annexed to the series, which consists in collecting, after it has reached the predetermined pressure, a supply of the carbonic-acid gas generated by the beer, forcing the collected carbonic-acid gas back in a retrograde movement whenever any deficiency of pressure occurs in the system by means of an extraneous aeriform fluid at substantially the predetermined pressure established for the beer, and throughout the operation relieving the beer from any pressure in excess of the predetermined pressure, substantially as described.

OTTO ZWIETUSCH.

In presence of—
JOHN G. HIRSCH,
ALFRED L. RIES.